United States Patent
Wang (10) Patent No.: US 9,501,674 B2
(45) Date of Patent: *Nov. 22, 2016

(54) TERMINAL FOR LINE-OF-SIGHT RFID TAG READING

(71) Applicant: HAND HELD PRODUCTS, INC., Fort Mill, SC (US)

(72) Inventor: Ynjiun P. Wang, Cupertino, CA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,252

(22) Filed: Jul. 28, 2014

(65) Prior Publication Data

US 2014/0333418 A1 Nov. 13, 2014

Related U.S. Application Data

(63) Continuation of application No. 12/892,477, filed on Sep. 28, 2010, now Pat. No. 8,791,795.

(51) Int. Cl.
*H04Q 5/22* (2006.01)
*G06K 7/10* (2006.01)

(52) U.S. Cl.
CPC ....... *G06K 7/10009* (2013.01); *G06K 7/10019* (2013.01); *G06K 7/10079* (2013.01); *G06K 7/10099* (2013.01); *G06K 7/10128* (2013.01); *G06K 7/10366* (2013.01); *G06K 7/10722* (2013.01)

(58) Field of Classification Search
CPC ... G06K 7/0008; G06K 7/10; G06K 7/10128
USPC ............... 340/10.4, 505, 12.54, 10.5
See application file for complete search history.

(56) References Cited

U.S. PATENT DOCUMENTS

| 5,557,092 A | 9/1996 | Ackley et al. |
| 5,675,137 A | 10/1997 | Van Haagen et al. |

(Continued)

FOREIGN PATENT DOCUMENTS

| EP | 1 638 035 A1 | 3/2006 |
| JP | 2006-309665 A | 11/2006 |
| WO | 2006/126768 A1 | 11/2006 |

OTHER PUBLICATIONS

EPC Information, Bar Code Graphic, INC, 2013.*

(Continued)

*Primary Examiner* — Vernal Brown
(74) *Attorney, Agent, or Firm* — Oliff PLC; R. Brian Drozd (57) ABSTRACT

There is provided a terminal for use in determining which of one or more candidate RFID tags having unique data stored thereon is a target RFID tag within an area of the terminal. The terminal can comprise program instructions to direct an RFID reading device of the terminal to perform a number of reads of the one or more candidate RFID tags in response to determining that an object is present in the area, to calculate an accumulated RSSI of each of the one or more candidate RFID tags, and to determine the target RFID tag from a highest accumulated RSSI. In one embodiment, the unique data can be an EPC. There is also provided a terminal for use in converting an EPC into a decoded bar code. The terminal can comprise program instructions to transmit the decoded bar code to a computer such as an electronic cash register.

20 Claims, 9 Drawing Sheets

(56) References Cited

U.S. PATENT DOCUMENTS

| | | |
|---|---|---|
| 6,012,638 A | 1/2000 | Ackley et al. |
| 6,237,114 B1 | 5/2001 | Wookey et al. |
| 6,430,554 B1 | 8/2002 | Rothschild |
| 6,597,465 B1 | 7/2003 | Jarchow et al. |
| 6,651,053 B1 | 11/2003 | Rothschild |
| 7,005,988 B2 | 2/2006 | Mathewson, II et al. |
| 7,012,529 B2 | 3/2006 | Sajkowsky |
| 7,199,719 B2 | 4/2007 | Steinberg |
| 7,267,270 B2 | 9/2007 | Hopwood et al. |
| 7,464,879 B2 | 12/2008 | Silverbrook et al. |
| 7,583,178 B2 | 9/2009 | Hougen et al. |
| 7,602,288 B2 | 10/2009 | Broussard |
| 7,619,524 B2 | 11/2009 | Calvarese |
| 7,654,454 B2 | 2/2010 | Silverbrook et al. |
| 7,765,253 B1 | 7/2010 | Sarma et al. |
| 7,774,346 B2 | 8/2010 | Hu et al. |
| 8,161,910 B2 | 4/2012 | Coiro, Sr. et al. |
| 8,305,192 B2 | 11/2012 | Connolly et al. |
| 2003/0216969 A1 | 11/2003 | Bauer et al. |
| 2004/0118916 A1 | 6/2004 | He |
| 2005/0109844 A1 | 5/2005 | Hilliard |
| 2005/0258252 A1 | 11/2005 | Winter et al. |
| 2005/0285742 A1 | 12/2005 | Charych et al. |
| 2007/0109100 A1 | 5/2007 | Jett et al. |
| 2008/0309494 A1 | 12/2008 | Bahar |
| 2009/0101712 A1 | 4/2009 | Ulrich et al. |
| 2009/0224045 A1 | 9/2009 | Toda et al. |
| 2009/0273449 A1 | 11/2009 | Tuttle |
| 2009/0315685 A1 | 12/2009 | Bauchot et al. |
| 2010/0019882 A1 | 1/2010 | Stern et al. |
| 2010/0117798 A1 | 5/2010 | Jenkins et al. |
| 2010/0148930 A1 | 6/2010 | Silverbrook et al. |

OTHER PUBLICATIONS

Mar. 6, 2015 Search Report issued in European Application No. 11182797.8.

Apr. 1, 2015 Office Action issued in European Application No. 11 182 797.8.

\* cited by examiner

TERMINAL FOR LINE-OF-SIGHT RFID TAG READING

CROSS-REFERENCE OF RELATED APPLICATIONS

This is a continuation of U.S. patent application Ser. No. 12/892,477 filed Sep. 28, 2010, and entitled "Terminal for Line-Of-Sight RFID Tag Reading." The disclosure of the prior application is hereby incorporated by reference herein in its entirety.

FIELD OF THE INVENTION

Embodiments of this invention relate in general to reading radio frequency identification (RFID) tags. For example, some embodiments of the invention relates to the use of radio frequency enabled terminals for reading RFID tags.

BACKGROUND OF THE INVENTION

RFID is a data collection technology that uses radio-sensitive tags for storing data. RFID tags, which are also commonly referred to as transponders, typically comprise two parts. The first part is an integrated circuit for storing and processing data, modulating and demodulating RF signals, and performing other specialized functions. The second part is an antenna that provides the means for the integrated circuit to transmit its stored data to an RFID reading device. An RFID reading device is also called an interrogator.

The communications between an RFID tag and an RFID reading device take place over a radio-based air interface. One such air interface is the Gen 2 air interface, which is a standard administered by EPCglobal Inc. Gen 2 defines, among other things, requirements for the format of the data, such as an Electronic Product Code (EPC), stored in the integrated circuit of an RFID tag. According to Gen 2, an EPC must comprise at least ninety-six bits and can include a unique serial number of a particular product to which a Gen 2 RFID tag is attached.

Figure 1:
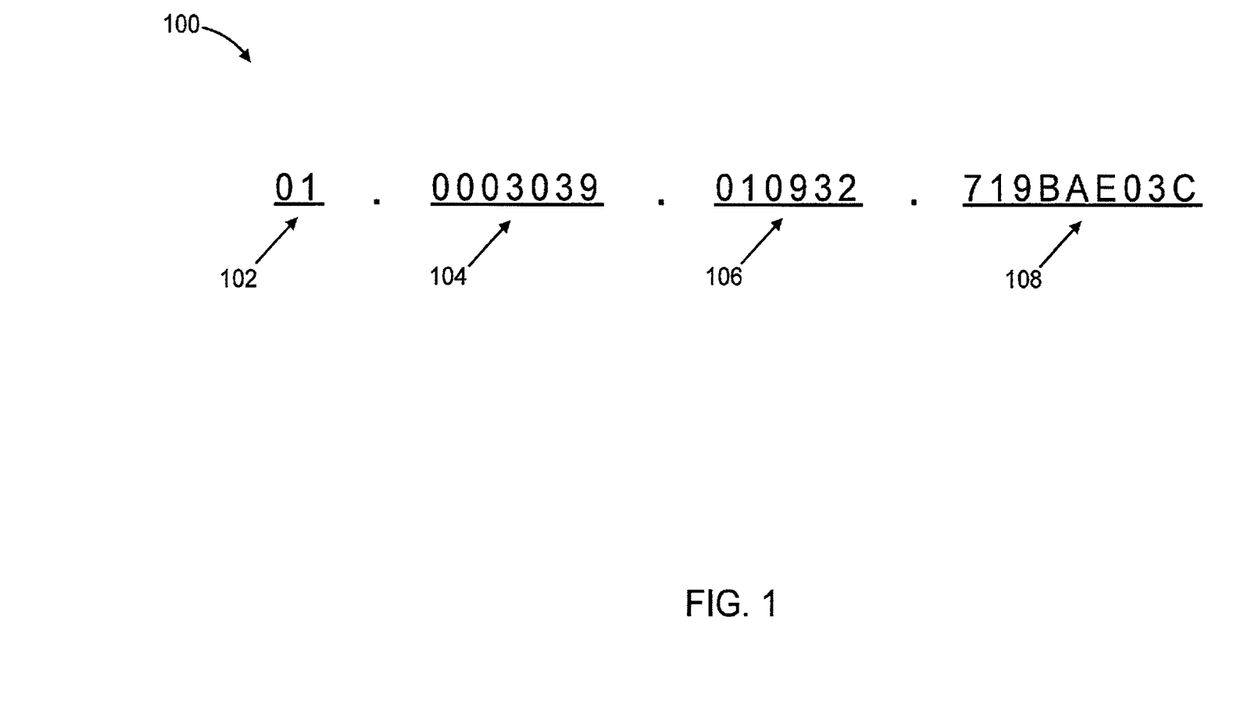
FIG. 1 is an illustration of an exemplary Electronic Product Code (EPC)

FIG. 1 is an illustration of an exemplary EPC 100. EPC 100 comprises header 102, manager number 104, object class 106, and serial number 108. Header 102 is eight bits in size, manager number 104 is twenty-eight bits in size, object class 106 is twenty-four bits in size, and serial number 108 is thirty-six bits in size. While EPC 700 is ninety-six bits in size, other EPCs can have different sizes that can be defined by EPCglobal Inc., e.g., sixty-four bits. Each two digit sequence in EPC 100 is a hexadecimal number representing eight bits (one byte) of EPC 100. Header 102 defines the length, type, structure version, and generation of EPC 100 (e.g., Gen 2). Manager number 104 is the entity responsible for maintaining object class 106 and serial number 108, e.g., a manufacturer. Object class 106 identifies a product. Object class 106 can be, e.g., a stock keeping unit (SKU) or consumer unit. Serial number 108 identifies a unique serial number for the product within object class 106. Thus, while object class 106 can categorically identify, e.g., a type of cereal product, serial number 108 can identify a particular box of the type of cereal product identified by object class 106.

In contrast to EPCs, Universal Product Codes (UPCs) and European (International) Article Numbers (EANs), which are typically encoded in bar codes, are devoid of a unique serial number having the purpose of serial number 108. Instead, UPCs and EANs have manufacturer codes analogous to manager number 104 and product codes analogous to object class 106, and are therefore more limited to categorically identifying, e.g., a type of cereal product of a manufacturer. UPCs and EANs can have different formats. For example, UPCs can be in UPC-A or UPC-E format, and EANs can be in EAN-13 or EAN-8 format.

Figure 2:
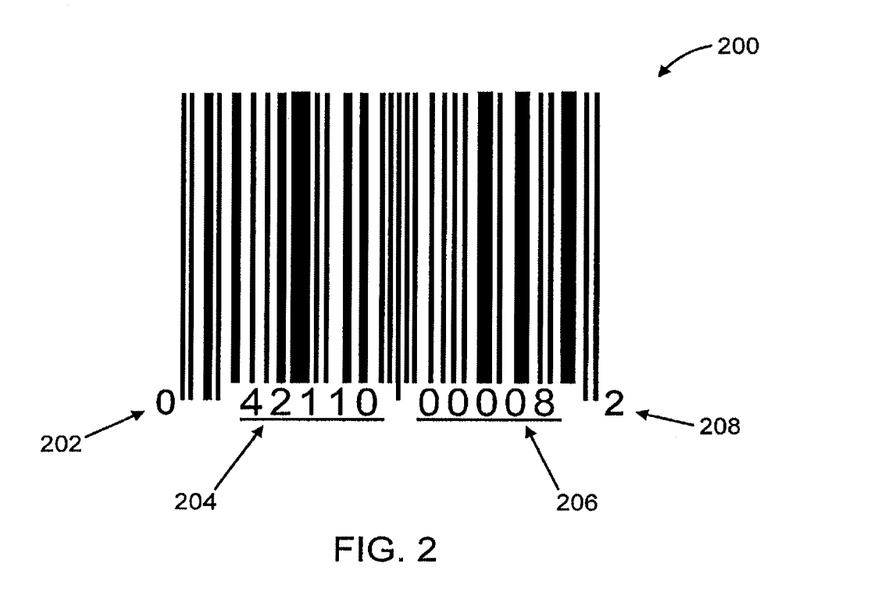
FIG. 2 is an illustration of an exemplary twelve-digit Universal Product Code (UPC)-A bar code.

FIG. 2 is an illustration of an exemplary twelve-digit UPC-A bar code 200. UPC-A bar code 200 comprises number system character 202, manufacturer code 204, product code 206, and check digit 208. Number system character 202 characterizes specific types of bar codes and appears on the left of bar code 200. Number system character 202 can be "0", which is a standard UPC number code, "1", which is a reserved code, "2", which is a code for random weight items like fruits, vegetables, and meats, "3", which is a code for pharmaceuticals, "4", which is an in-store code for retailers, "5", which is a code for coupons, "6", which is a standard UPC number code, "7", which is a standard UPC number code, "8", which is a reserved code, or "9", which is a reserved code. Manufacturer code 204 is a five digit number specifically assigned to the manufacturer of the product bearing bar code 200. Manufacturer codes are maintained and assigned by the Uniform Code Council (UCC). Each product of a manufacturer carries the same manufacturer code. For example, the manufacturer code for all Kellogg's® products is 38000. Kellogg's is a trademark or registered trademark of Kellogg NA Co. in the United States, other countries, or both. Product code 206 is a five digit number that the manufacturer assigns for a particular product. Each different product and each different packaging or size is assigned a unique product code. For example, while the product code for Kellogg's® 13.5 oz. Rice Krispies® is 90530, the product code for Kellogg's® 16 oz. Mini-Wheats® is 02720. Rice Krispies and Mini-Wheats are trademarks or registered trademarks of Kellogg NA Co. in the United States, other countries, or both. A manufacturer can have up to 99,999 unique product codes. Check digit 208 is located on the outside right of bar code 200 and can be calculated using any known check digit calculation algorithm. A bar code reading device utilizes check digit 208 to validate that number system character 202, manufacturer code 210, and product code 212 were read correctly.

Figure 3:
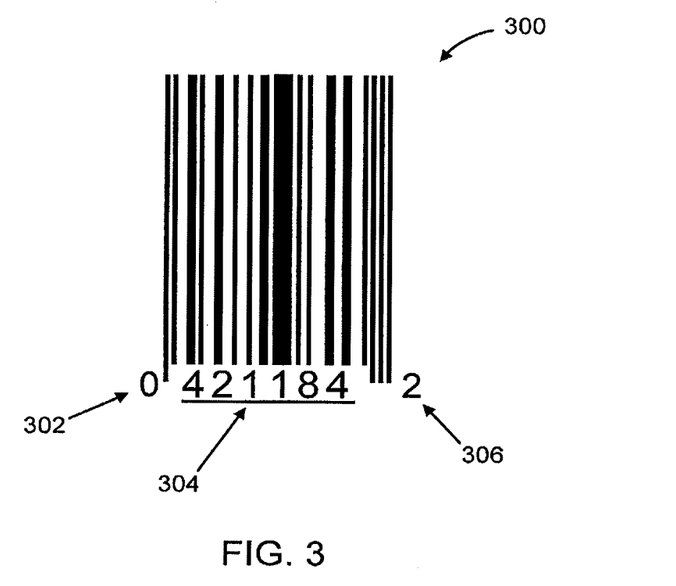
FIG. 3 is an illustration of an exemplary UPC-E bar code.

FIG. 3 is an illustration of an exemplary UPC-E bar code 300. UPC-E bar code 300 comprises number system character 302, which is the same as number system character 202 of UPC-A bar code 200, compressed code 304, and check digit 306, which is the same as check digit 208 of UPC-A bar code 200. Compressed code 304 is a six-digit representation of manufacturer code 204 and product code 206 of UPC-A bar code 200. Compressed code 304 can be calculated using any known UPC-A to UPC-E conversion algorithm.

Figure 4:
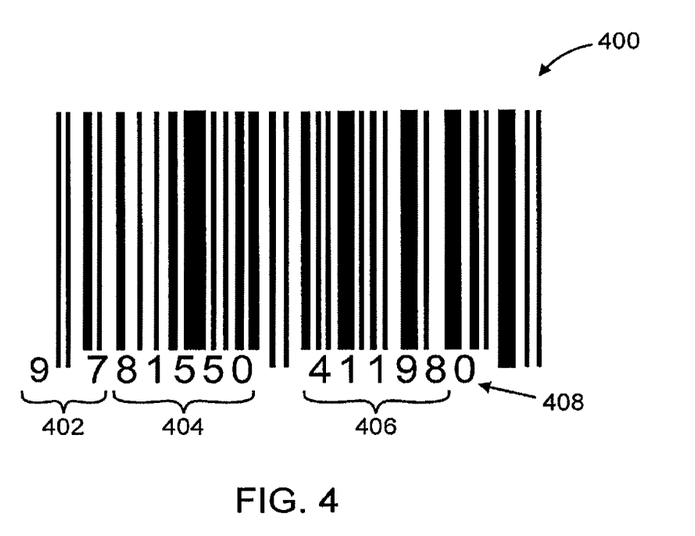
FIG. 4 is an illustration of an exemplary European Article Number (EAN)-13 bar code.

FIG. 4 is an illustration of an exemplary EAN-13 bar code 400. EAN-13 bar code comprises number system 402, manufacturer code 404, product code 406, and check digit 408. Number system 402 comprises two digits that identify a country/region numbering authority. Manufacturer code 404 is a unique code assigned to each manufacturer by the numbering authority indicated in number system 402. All products of the manufacturer identified by manufacturer code 404 have an EAN-13 bar code comprising manufacturer code 404. Product code 406 is a unique code assigned by the manufacturer identified by manufacturer code 404. The total length of manufacturer code 404 and product code 406 must be ten digits. Typically, manufacturer code 404 and product code 406 are each five digits, and therefore each manufacturer can have up to 99,999 product codes. However, if a manufacturer knows that it is only going to produce a few products, a longer manufacturer code may be assigned to the manufacturer, leaving less space for the product code, and resulting in more efficient use of available manufacturer codes.

Figure 5:
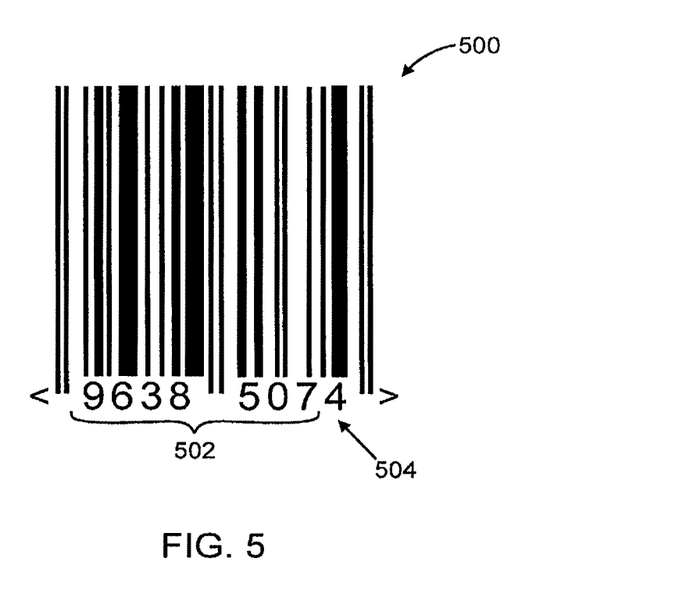
FIG. 5 is an illustration of an exemplary EAN-8 bar code.

FIG. 5 is an illustration of an exemplary EAN-8 bar code 500. EAN-8 bar code 500 comprises a seven-digit message 502 and a check digit 504. The first two or three digits of message 502 identify the numbering authority, and the remaining four or five digits of message 502 identify the product. While EAN-8 is a short version of EAN-13, there are no defined methods of conversion between EAN-13 and EAN-8.

While a bar code, such as UPC-A bar code 200, UPC-E bar code 300, EAN-13 bar code 400, or EAN-8 bar code 500, must be in the line-of-sight of a bar code reading device for reading, an RFID tag need not be in the line-of-sight of an RFID reading device for reading. An RFID reading device has a radio transceiver, which generates a weak radio signal, and an antenna that transmits the radio signal. The radio signal may have a range from a few feet to a few yards. If an RFID tag receiving the radio signal is "passive," the radio signal "wakes up" or activates the RFID tag, and the RFID tag responds by transmitting the data stored in its integrated circuit via radio signal to the RFID reading device. If the RFID tag is "active," the RFID reading device's radio signal need not "awaken" the RFID tag. An active RFID tag has a battery that is used to boost its effective operating range. An active RFID tag will simply send its stored data by radio signal to the RFID reading device in response to receiving a radio signal from the RFID reading device. A measurement of the quality of a radio signal, e.g., a radio signal sent by an RFID tag to an RFID reading device, is a received signal strength indication (RSSI).

SUMMARY OF THE INVENTION

There is provided a terminal for use in determining which of one or more candidate RFID tags having unique data stored thereon is a target RFID tag within an area, such as a line-of-sight, of the terminal. The terminal can comprise first program instructions to direct an image sensor of the terminal to capture one or more frames of image data within the area or line-of-sight of the terminal, second program instructions to determine, from the one or more frames of image data, whether an object is present in the area or line-of-sight of the terminal, third program instructions to direct an RFID reading device of the terminal to perform a number of reads of the one or more candidate RFID tags in response to determining that an object is present in the area or line-of-sight of the terminal, fourth program instructions to calculate an accumulated RSSI of each of the one or more candidate RFID tags, and fifth program instructions to determine the target RFID tag from a highest accumulated RSSI. In one exemplary embodiment, the unique data stored on the one or more candidate RFID tags can be an EPC.

There is also provided a terminal for use in converting an EPC into a decoded bar code. The terminal can comprise first program instructions to convert a manager number of the EPC into a manufacturer code, second program instructions to convert an object class of the EPC into a product code, and third program instructions to construct the decoded bar code from the manufacturer code and the product code.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION OF THE INVENTION

Figure 6:
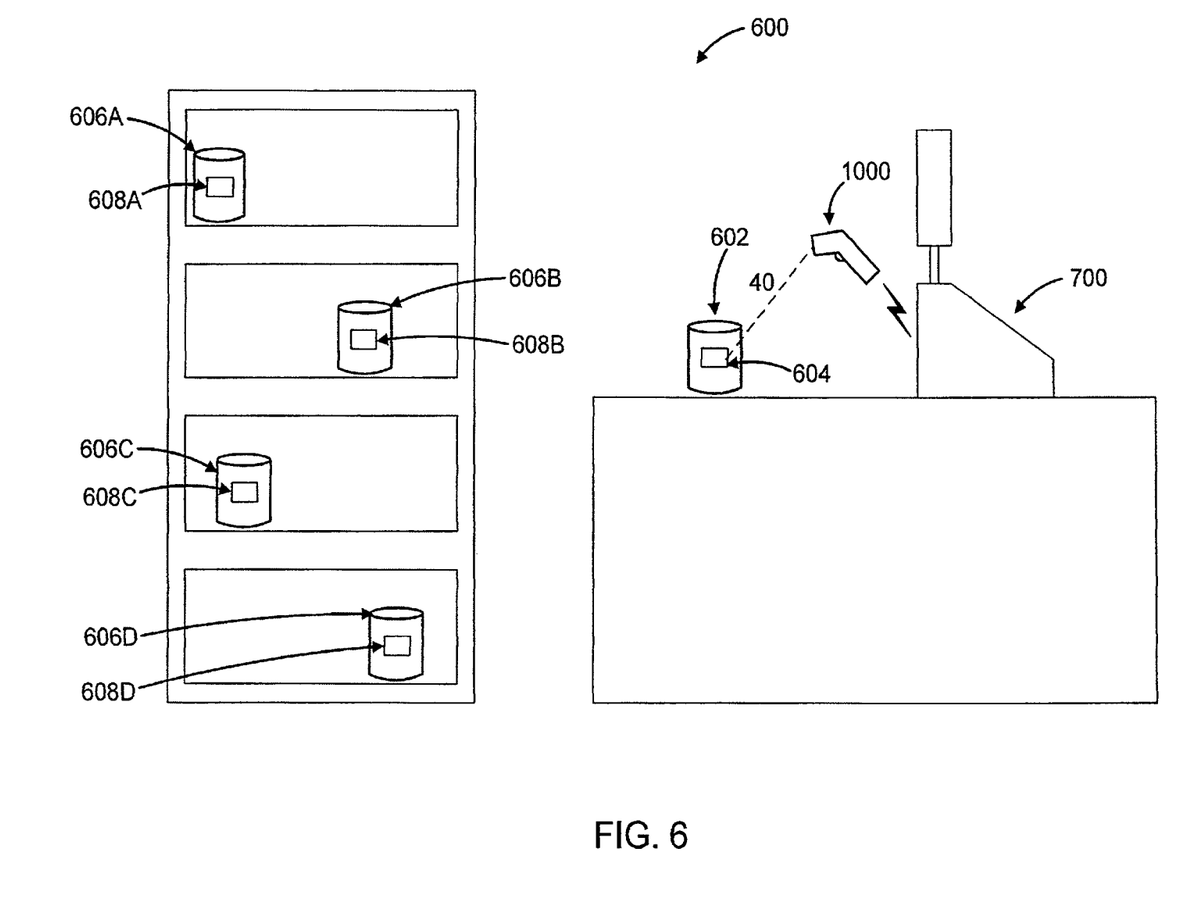
FIG. 6 is a diagram illustrating a point-of-sale system comprising a terminal in communication with an electronic cash register.

In certain practical applications, it is desirous that an RFID reading device read an RFID tag that is within the line-of-sight of the RFID reading device. One such practical application is shown in FIG. 6. FIG. 6 is a diagram illustrating a point-of-sale system 600 comprising a terminal 1000 in communication with an electronic cash register 700. Terminal 1000 can comprise an RFID reading device (not shown) for reading RFID tags. A consumer has presented item 602, having line-of-sight RFID tag 604, in line-of-sight 40 of terminal 1000, for purchase at the point of sale. Item 606A having RFID tag 608A, item 606B having RFID tag 608B, item 606C having RFID tag 608C, and item 606D having RFID tag 608D are stocked inventory on a shelf nearby terminal 1000. In the course of developing terminal 1000, it was found that in an attempt by terminal 1000 to read line-of-sight RFID tag 604, any of line-of-sight RFID tag 604, and RFID tags 608A, 608B, 608C, and 608D, which are outside of line-of-sight 40 of terminal 1000, may send its stored EPC to terminal 1000. It is desirous, however, that terminal 1000 communicate only a representation of an EPC stored in line-of-sight RFID tag 604 to electronic cash register 700 so that the consumer is charged only for item 602 and not for items 606A, 606B, 606C, and/or 606D.

In one exemplary embodiment of the invention, a terminal for use in determining which of one or more candidate RFID tags having unique data stored thereon is a target RFID tag within a line-of-sight of the terminal can comprise one or more processors, a computer readable storage medium, an image sensor, and an RFID reading device. The terminal can further comprise first program instructions to direct an the image sensor to capture one or more frames of image data within the line-of-sight of the terminal, second program instructions to determine, from the one or more frames of image data, whether an object is present in the line-of-sight of the terminal, third program instructions to direct the RFID reading device to perform a number of reads of the one or more candidate RFID tags in response to determining that an object is present in the line-of-sight of the terminal, fourth program instructions to calculate an accumulated RSSI of each of the one or more candidate RFID tags, and fifth program instructions to determine the target RFID tag from a highest accumulated RSSI. The first, second, and third program instructions can be stored on the computer readable storage medium for execution by the one or more processors. In one exemplary embodiment, the unique data stored on the one or more candidate RFID tags can be an EPC.

While terminal 1000 can transmit an EPC to electronic cash register 700, it was found during the development of terminal 1000 that electronic cash register 700 may be devoid of functionality to determine the price of an item, e.g., item 602, from an EPC, e.g., an EPC stored in line-of-sight RFID tag 604. However, electronic cash register 700 can include functionality to determine the price of an item bearing a UPC or EAN. Accordingly, in another exemplary embodiment of the invention, a terminal for use in converting an electronic product code (EPC) into a decoded bar code can comprise one or more processors, a computer readable storage medium, first program instructions to convert a manager number of the EPC into a manufacturer code, second program instructions to convert an object class of the EPC into a product code, and third program instructions to construct the decoded bar code from the manufacturer code and the product code. The first, second, and third program instructions can be stored on the computer readable storage medium for execution by the one or more processors. The manufacturer code can be a UPC manufacturer code or an EAN manufacturer code, and the product code can be a UPC product code or an EAN product code. In one exemplary embodiment, the terminal can further comprise fourth program instructions to transmit the decoded bar code to a computer, e.g, electronic cash register 700.

Figure 7:
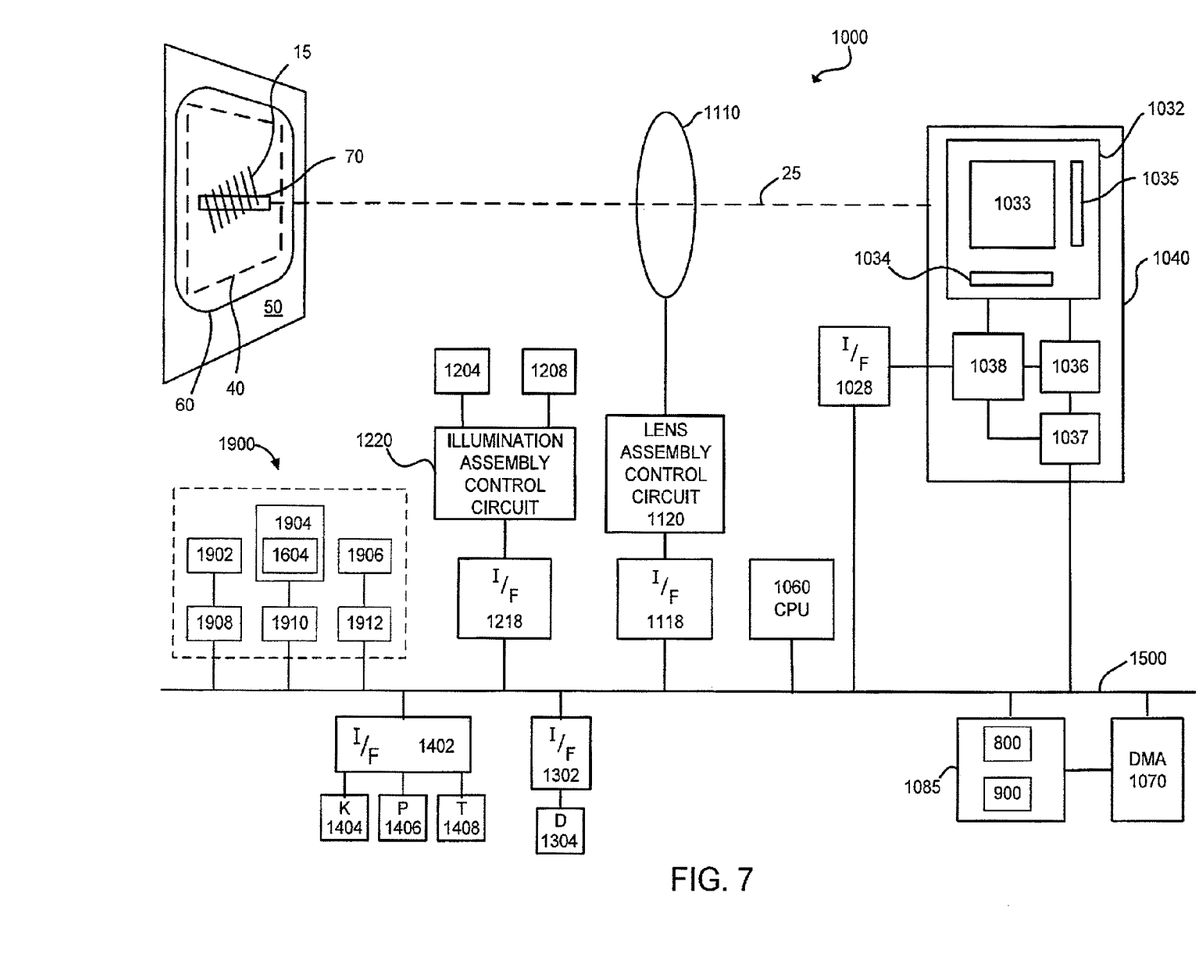
FIG. 7 is a block diagram of a terminal according to an exemplary embodiment of the invention.

Turning now to FIG. 7, FIG. 7 is a block diagram of a terminal 1000 according to an exemplary embodiment of the invention. Terminal 1000 can include an image sensor 1032 comprising a multiple pixel image sensor array 1033 having pixels arranged in rows and columns of pixels, associated column circuitry 1034, and row circuitry 1035. Associated with the image sensor 1032 can be amplifier circuitry 1036, and an analog-to-digital converter 1037 that converts image information in the form of analog signals read out of image sensor array 1033 into image information in the form of digital signals. Image sensor 1032 can also have an associated timing and control circuit 1038 for use in controlling, e.g., the exposure period of image sensor 1032, gain applied to the amplifier 1036. The noted circuit components 1032, 1036, 1037, and 1038 can be packaged into a common image sensor integrated circuit 1040. In one exemplary embodiment of the invention, image sensor integrated circuit 1040 can be provided by an MT9V022 image sensor integrated circuit available from Micron Technology, Inc. In another exemplary embodiment of the invention, image sensor integrated circuit 1040 can be provided by an EV76C454 CMOS standard sensor available from E2V Technologies PLC of Essex, England. In another exemplary embodiment of the invention, image sensor integrated circuit 1040 can incorporate a Bayer pattern filter. In such an embodiment, CPU 1060, prior to subjecting a frame of image data to further processing, can interpolate pixel values intermediate of green pixel values for development of a monochrome frame of image data.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

A succession of frames of image data that can be captured can be full frames (including pixel values corresponding to more than about 80% of pixels of image sensor 1032). A succession of frames of image data that can be captured can also be "windowed frames" comprising pixel values corresponding to less than about 80%, and in some cases less than about 50%, and in some cases less than 10%, of pixels of image sensor 1032. A succession of frames of image data that can be captured can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

In the course of operation of terminal 1000, image signals can be read out of image sensor 1032, converted, and stored into computer readable medium 1085. Computer readable medium 1085 can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one exemplary embodiment of the invention, terminal 1000 can include a processor provided by a CPU 1060, which processor can be a programmable processor for executing program instructions stored on computer readable medium 1085. In another exemplary embodiment of the invention, there can be a division of labor in executing program instructions stored on computer readable medium 1085 between the processor provided by CPU 1060 and one or more processors of other components of terminal 1000, e.g., RFID reading device 1904.

CPU 1060 can be adapted to read out image data stored in computer readable medium 1085 and subject such image data to various image processing algorithms. In another exemplary embodiment of the invention, there can Terminal 1000 can include a direct memory access unit (DMA) 1070 for routing image information read out from image sensor 1032 that has been subject to conversion to computer readable medium 1085. In another exemplary embodiment of the invention, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and computer readable medium 1085 are within the scope and spirit of the invention.

Tag reading program function 800 and conversion program function 900 can be stored on computer readable medium 1085. Tag reading program function 800 can be computer program code comprising a computer program product for determining which of one or more candidate RFID tags is a target RFID tag within line-of-sight 40 of terminal 1000. Conversion program function 900 can be computer program code comprising a computer program product for converting an EPC into a decoded bar code. Tag reading program function 800 and conversion program function 900 can be transmitted using any appropriate medium, including but not limited to wireless, wireline, optical fiber cable, RF, etc., or any suitable combination of the foregoing. Tag reading program function 800 and conversion program function 900 can include program instructions written in any combination of one or more programming languages, including an object oriented programming language such as Java, Smalltalk, C++ or the like, conventional procedural programming languages, such as the "C" programming language, low-level programming languages, such as assembly language, or other high- or low-level programming languages.

Referring to further aspects of terminal 1000, terminal 1000 can include an imaging lens assembly 1110 for focusing an image of a decodable indicia located within line-of-sight 40 on a substrate 50 onto image sensor array 1033. Imaging light rays can be transmitted about imaging axis 25. Lens assembly 1110 can be adapted to be capable of multiple focal lengths and multiple best focus differences.

Terminal 1000 can also include an illumination pattern light source bank 1204 for generating an illumination pattern 60 substantially corresponding to line-of-sight 40 of terminal 1000 and an aiming pattern light source bank 1208 for generating an aiming pattern 70 on substrate 50. In use, terminal 1000 can be oriented by an operator with respect to a substrate 50 bearing decodable indicia in such a manner that aiming pattern 70 is projected on a decodable indicia 15. In the example of FIG. 7, decodable indicia 15 is provided by a 1D bar code symbol. Decodable indicia 15 could also be provided by 2D bar code symbols or optical character recognition (OCR) characters. Each of illumination pattern light source bank 1204 and aiming pattern light source bank 1208 can include one or more light sources. Lens assembly 1110 can be controlled with use of lens assembly control circuit 1120 and the illumination assembly comprising illumination pattern light source bank 1204 and aiming pattern light source bank 1208 can be controlled with use of illumination assembly control circuit 1220. Lens assembly control circuit 1120 can send signals to lens assembly 1110, e.g., for changing a focal length and/or a best focus distance of lens assembly 1110. Illumination assembly control circuit 1220 can send signals to illumination pattern light source bank 1204, e.g., for changing a level of illumination output by illumination pattern light source bank 1204.

Terminal 1000 can also include a number of peripheral devices such as display 1304 for displaying such information as image frames captured with use of terminal 1000, keyboard 1404, pointing device 1406, and trigger 1408 which may be used to make active a trigger signal for activating frame readout and/or certain decoding processes. Terminal 1000 can be adapted so that activation of trigger 1408 activates the trigger signal and initiates a decode attempt.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling lens assembly control circuit 1120 to system bus 1500, interface circuit 1218 for coupling illumination assembly control circuit 1220 to system bus 1500, interface circuit 1302 for coupling display 1304 to system bus 1500, and interface circuit 1402 for coupling keyboard 1404, pointing device 1406, and trigger 1408 to system bus 1500.

Terminal 1000 can further comprise an encoded information reading (EIR) device 1900. EIR device 1900 can comprise a bar code reading device 1902, an RFID reading device 1904, and a card reading device 1906. Bar code reading device 1902 can be provided by an IT4XXX/5XXX Imaging Module with decode out circuit of the type available from Hand Held Products, Inc. of Skaneateles Falls, N.Y. The IT4XXX/5XXX Imaging Module with decode out circuit provides decoding of a plurality of different types of bar code symbols and other decodable symbols such as PDF 417, Micro PDF 417, MaxiCode, Data Matrix, QR Code, Aztec, Aztec Mesa, Code 49, UCC Composite, Snowflake, Data Gliffs, Code 39, Code 128, Codabar, UPC, EAN, Interleaved 205, RSS, Code 93, Codablock, BC412, Postnet, Planet Code, Japanese Post, KIX (Dutch Post), OCR A and OCR B.

RFID reading device 1904 can be provided by a Skytek Sky Module M1 reading terminal. RFID reading device can comprise radio transceiver 1604 for providing communication with external devices (e.g., electronic cash register 700 shown in FIG. 6, a peer terminal of terminal 1000, a store server, an inventory facility server, a local area network base station, a cellular base station). Radio transceiver 1604 can be encapsulated by hand held housing 11 shown in FIG. 8. In one exemplary embodiment of the invention, radio transceiver 1604 can be a 915 MHz radio transceiver. In another exemplary embodiment of the invention, radio transceiver 1160 can be a Bluetooth radio transceiver. Terminal 1000 can incorporate the Bluetooth protocol stack, which a radio layer, a baseband layer , a link controller, a link manager (LM), a host controller interface (HCI), an L2CAP layer an RFCOMM/SDP layer, and an applications layer 716. RFCOMM/SDP layer 714 is the transport layer of Bluetooth with provision for RS-232 serial port emulation, which can be used to connect to legacy application and data transfer using several Bluetooth profiles.

Card reading device 1906 can include an integrated circuit card (IC CARD) reading terminal device, otherwise known as a smart card reader. Bar code reading device 1902, RFID reading device 1904, and card reading device 1906 can be coupled to system bus 1500 via interface circuits 1908, 1910, and 1912, respectively. In one embodiment, EIR device 1900 can output decoded message data, e.g., decoded bar code message data, decoded RFID message data, decoded mag stripe message data, and/or decoded smart card message data, corresponding to an encoded message. In another embodiment, EIR device 1900 can output raw message data containing an encoded message, e.g., raw image data or raw RFID data, to be processed by CPU 1060.

Figures 8, 9, 10:
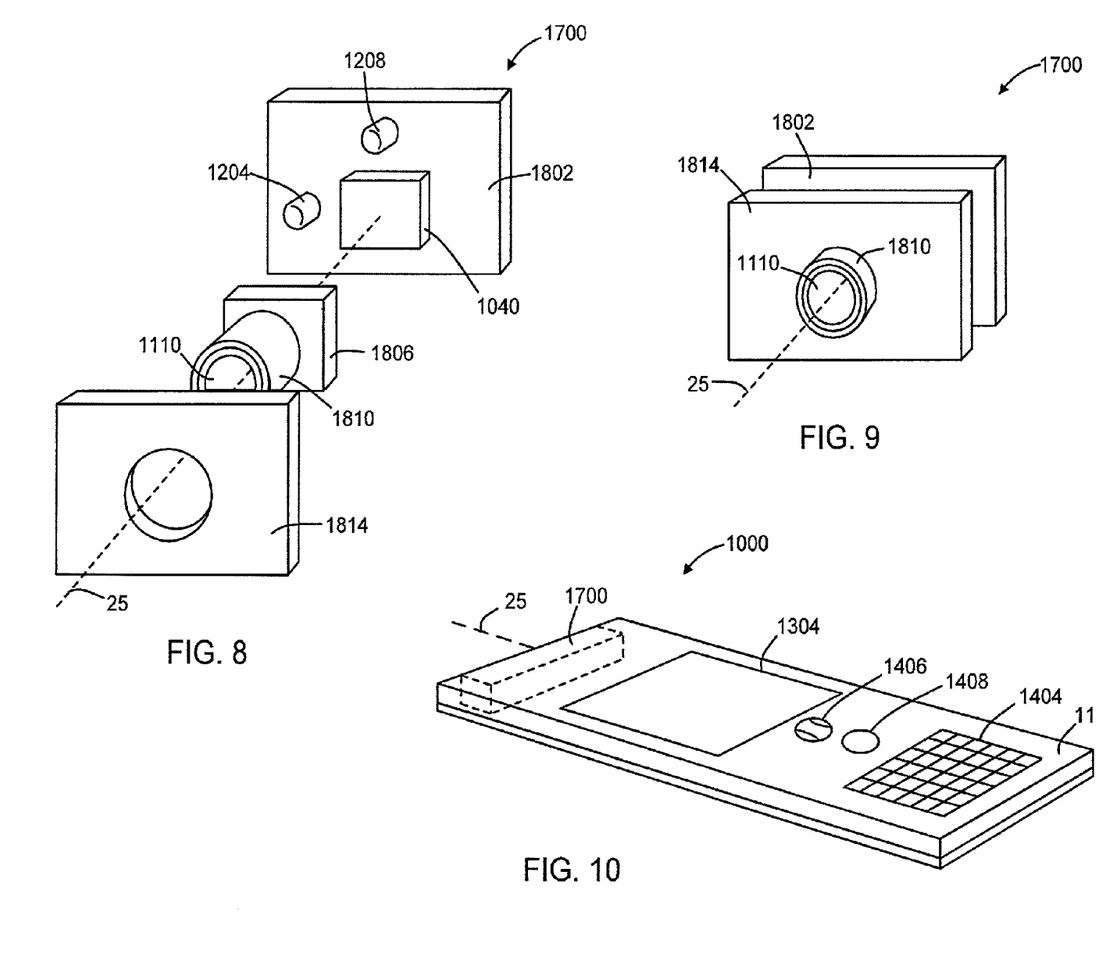
FIGS. 8 and 9 illustrate an exemplary hand held terminal housing.
FIG. 10 is a perspective view of a faun factor and housing for a terminal according to an exemplary embodiment of the invention.

Referring to FIGS. 8 and 9, an imaging module 1700 for supporting components of terminal 1000 can include image sensor integrated circuit 1040 disposed on a printed circuit board 1082 together with illumination pattern light source bank 1204 and aiming pattern light source bank 1208 each shown as being provided by a single light source. Imaging module 1700 can also include containment 1806 for image sensor integrated circuit 1040, and housing 1810 for housing lens assembly 1110. Imaging module 1700 can also include optical plate 1814 having optics for shaping light from bank 1204 and bank 1208 into predetermined patterns. Imaging module 1700 can be disposed in a hand held housing 11, an example of which is shown in FIG. 10. Disposed on hand held housing 11 can be display 1304, trigger 1408, pointing device 1406, and keyboard 1404.

Figure 11:
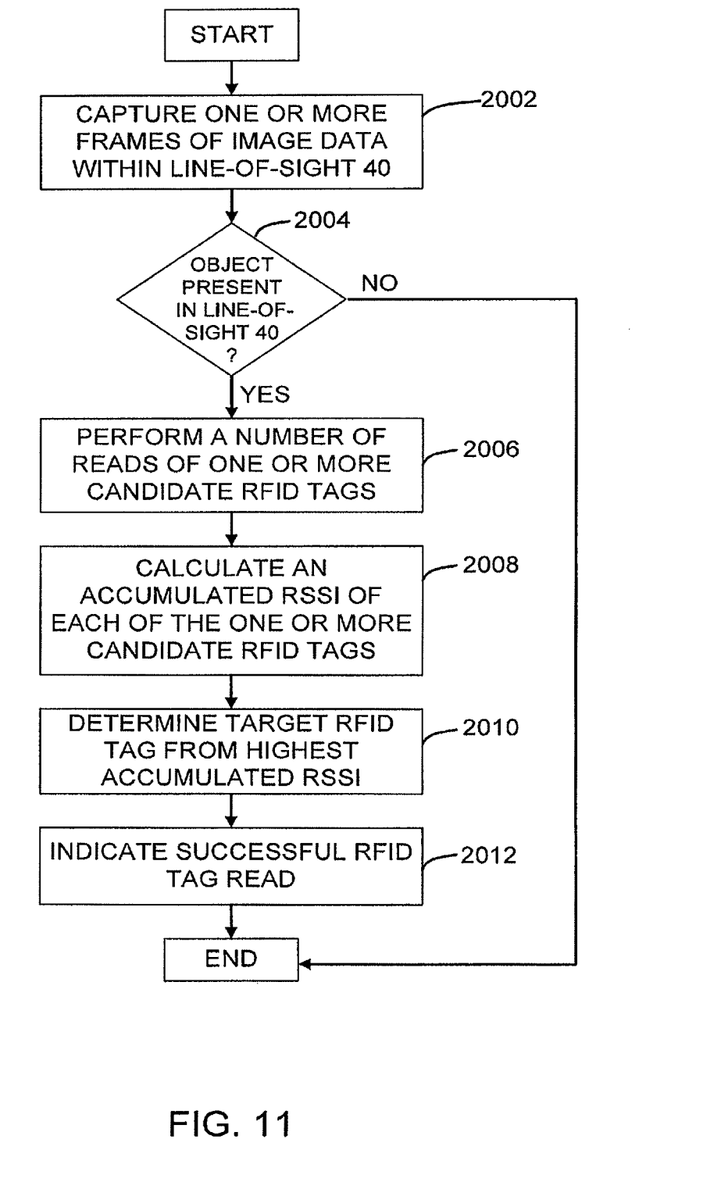
FIG. 11 is a flowchart of a method for determining which of one or more candidate RFID tags is a target RFID tag within a line-of-sight of a terminal according to an exemplary embodiment of the invention.

FIG. 11 is a flowchart of a method for determining which of one or more candidate RFID tags is a target RFID tag within line-of-sight 40 of terminal 1000 according to an exemplary embodiment of the invention. It will be understood that each block or combination of blocks shown in FIG. 11 can be implemented by computer program instructions of tag reading program function 800, which computer program instructions can be stored on computer readable medium 1085 and can be executed by CPU 1060.

At block 2002, tag reading program function 800 can direct image sensor 1032 to capture one or more frames of image data within line-of-sight 40. In one exemplary embodiment of the invention, at block 2002, tag reading program function 800 can direct image sensor 1032 to capture the one or more frames of image data in response to the actuation of trigger 1408.

At block 2004, tag reading program function 800 can determine, from one or more of the frames of image data, whether an object, e.g., item 602 shown in FIG. 6, is present in line-of-sight 40 of terminal 1000. Tag reading program function 200 can determine whether an object is present in line-of-sight 40 using any known object detection methods. If at block 2004, tag reading program function 800 determines that an object is present in line-of-sight 40, processing moves to block 2006.

At block 2006, tag reading program function 800 can direct RFID reading device 1904 to perform a number of reads of the one or more candidate RFID tags in response to detecting the presence of an object at block 2004. In one exemplary embodiment of the invention, each of the one or more candidate RFID tags can have data stored thereon that is unique among the one or more candidate RFID tags. For example, the data stored on each of the one or more candidate RFID tags can be an EPC that is unique among the one or more candidate RFID tags. In another exemplary embodiment of the invention, the number of reads performed at block 2006 can be configured by a user, e.g., through a user interface presented on a display, such as display 1304, or from a file stored on a computer readable medium, such as computer readable medium 1085.

At block 2008, tag reading program function 800 can calculate an accumulated RSSI of each of the one or more candidate RFID tags. In one exemplary embodiment of the invention, the accumulated RSSI of one of the one or more candidate RFID tags can be the sum of one or more RSSIs, each of the one or more RSSIs corresponding to a different radio signal received in the number of reads from the one of the one or more candidate RFID tags.

At block 2010, tag reading program function 800 can determine the target RFID tag from a highest accumulated RSSI. In one exemplary embodiment of the invention, the highest accumulated RSSI is the accumulated RSSI that is highest among the one or more candidate RFID tags.

At block 2012, tag reading program function 800 can direct terminal 1000 to generate an indication of a successful RFID tag read. In one exemplary embodiment of the invention, at block 2102, tag reading program function can direct terminal 1000 to emit an audible sound indicating a successful RFID tag read. In another exemplary embodiment of the invention, the sound can be a "beep".

Figure 12:
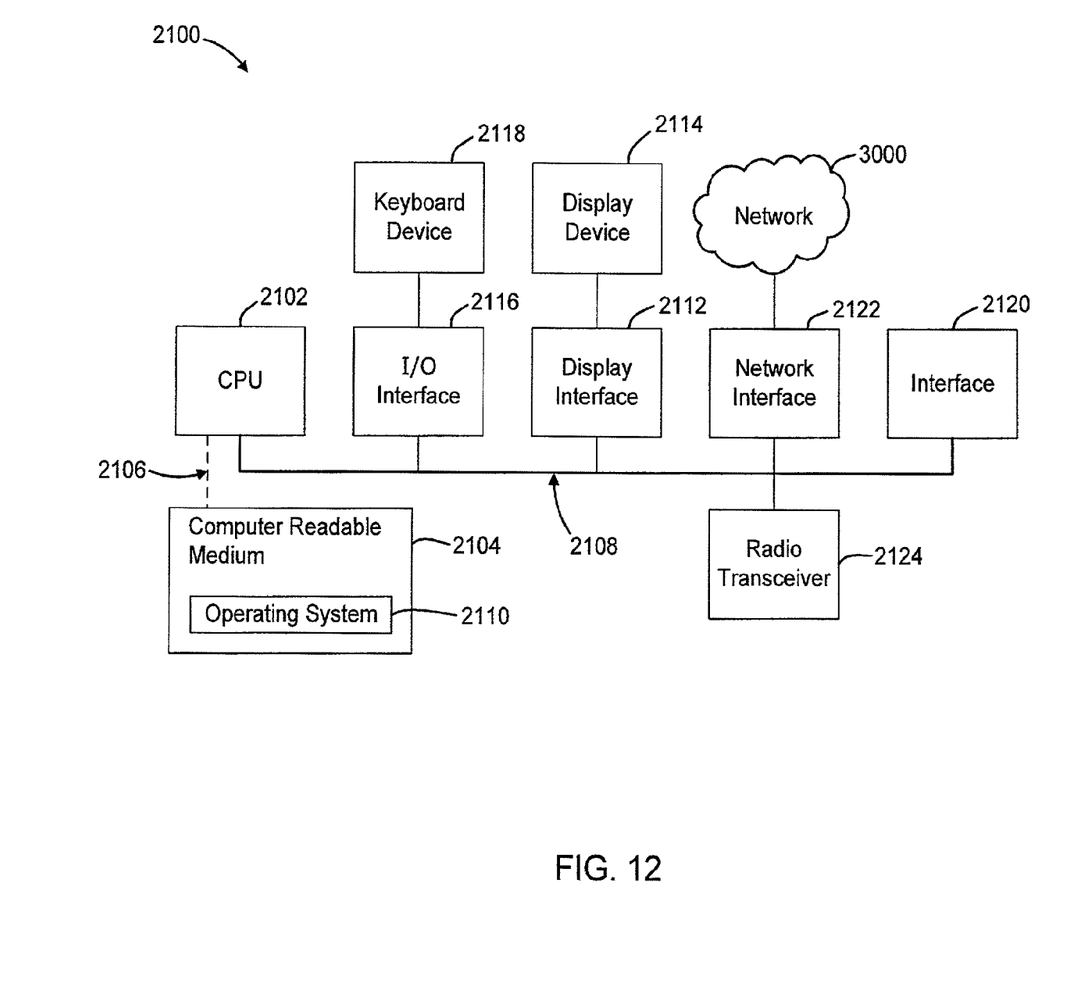
FIG. 12 is a simplified block diagram of an electronic cash register according to an exemplary embodiment of the invention.

FIG. 12 is a simplified block diagram of an electronic cash register 2100 according to an exemplary embodiment of the invention. Electronic cash register 2100 can have a processor provided by a central processing unit (CPU) 2102. The processor can be a programmable processor for executing program instructions stored on computer readable medium 2104. CPU 2102 can be a reduced instruction set (RISC) microprocessor such as an IBM® PowerPC® processor, an x86 compatible processor such as an Intel® Pentium® processor, an Advanced Micro Devices® Athlon® processor, or any other suitable processor. IBM and PowerPC are trademarks or registered trademarks of International Business Machines Corporation in the United States, other countries, or both. Intel and Pentium are trademarks or registered trademarks of Intel Corporation or its subsidiaries in the United States, other countries, or both. Advanced Micro Devices and Athlon are trademarks or registered trademarks of Advanced Micro Devices, Inc. or its subsidiaries in the United States, other countries, or both. In other embodiments, CPU 2102 may comprise one or more processors distributed across one or more locations, e.g., on a client and server.

CPU 2102 can be connected to computer readable medium 2104 through a dedicated system bus 2106 and/or a general system bus 2108. Computer readable medium 2104 can be a computer readable signal medium or a computer readable storage medium. Computer readable storage medium 2104 can be used for storage of software instructions and configuration settings. For example, operating system 2110 can be stored on computer readable medium 2104. It is appreciated that in other embodiments, electronic cash register 2100 can be implemented in a distributed computing environment having a plurality of computers communicating via network 3000.

Operating system 2110 can provide functions such as device interface management, memory management, and multiple task management. Operating system 2110 can be a Unix based operating system such as the IBM® AIX® operating system, a non-Unix based operating system such as an operating system falling within the Microsoft® Windows® family of operating systems, a network operating system such as Sun Microsystems® JavaOS®, or any other suitable operating system. IBM and AIX are trademarks or registered trademarks of International Business Machines Corporation in the United States, other countries, or both. Microsoft and Windows are trademarks or registered trademarks of Microsoft Corporation in the Untied States, other countries, or both. Sun Microsystems and Java and all Java-based trademarks and logos are trademarks of Sun Microsystems, Inc. in the United States, other countries, or both. CPU 2102 can be suitably programmed to read, load, and execute instructions of operating system 2110.

General system bus 2108 can support transfer of data, commands, and other information between various subsystems of electronic cash register 2100. While shown in simplified form as a single bus, general system bus 2108 can be structured as multiple buses arranged in hierarchical form. Display interface 2112 can support video display device 2114, which can be a cathode-ray tube display or a display based upon other suitable display technology. The input/output interface 2116 can support devices suited for input and output, such as keyboard 2118, a mouse device (not shown), or a disk drive unit (not shown).

Interface 2120 can be used for operationally connecting many types of peripheral computing devices to electronic cash register 2100 via general system bus 2108, such as printers, bus adapters, and other computers. Network interface 2122 can provide a physical interface to network 3000. Network interface 2122 can be any type of adapter that provides an interface between electronic cash register 2100 and network 3000, such as a modem that can be connected to a transmission system such as a telephone line, an Ethernet adapter, or a Token Ring adapter. Electronic cash register 2100 can be connected to another network server via a LAN using an appropriate network protocol and the network server that can in turn be connected to the Internet.

Electronic cash register can include radio transceiver 2124 for providing communication with external devices (e.g., terminal 1000). Radio transceiver 2124 can be, e.g., a 915 MHz radio transceiver.

Figure 13:
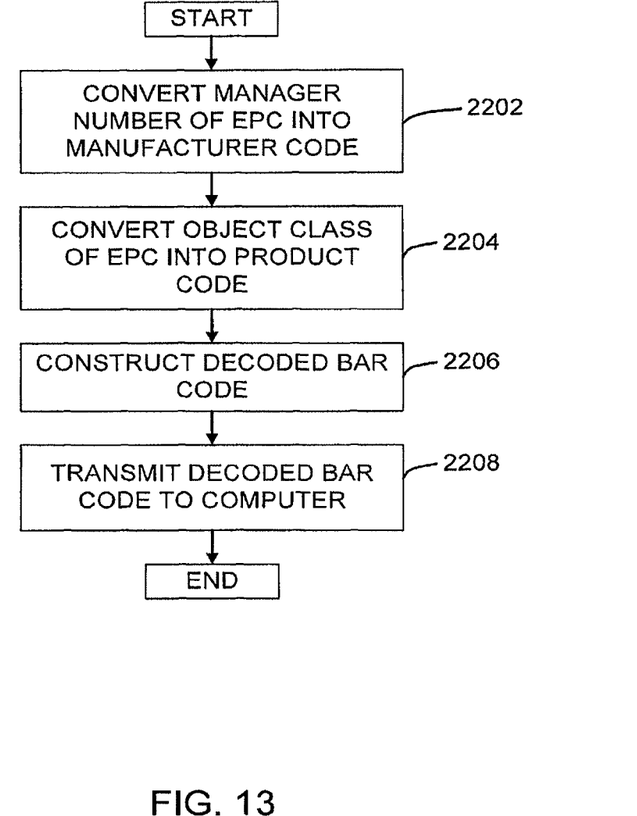
FIG. 13 is a flowchart of a method for converting an EPC into a decoded bar code according to one exemplary embodiment of the invention.

FIG. 13 is a flowchart of a method for converting an EPC into a decoded bar code according to one exemplary embodiment of the invention. It will be understood that each block or combination of blocks shown in FIG. 13 can be implemented by computer program instructions of conversion program function 900, which computer program instructions can be stored on computer readable medium 1085 and can be executed by CPU 1060.

At block 2202, conversion program function 900 can convert a manager number of the EPC into a manufacturer code. In one exemplary embodiment of the invention, at block 2202, conversion program function 900 can convert a hexadecimal representation of the manager number into a decimal representation of the manufacturer code. In another exemplary embodiment of the invention, the decimal representation of the manufacturer code can be a UPC-A manufacturer code. In another exemplary embodiment of the invention, the decimal representation of the manufacturer code can be an EAN-13 manufacturer code.

At block 2204, conversion program function 900 can convert an object class of the EPC into a product code. In one exemplary embodiment of the invention, at block 2204, conversion program function 900 can convert a hexadecimal representation of the object class into a decimal representation of the product code. In another exemplary embodiment of the invention, the decimal representation of the product code can be a UPC-A product code. In another exemplary embodiment of the invention, the decimal representation of the product code can be an EAN-13 product code.

At block 2206, conversion program function 900 can construct the decoded bar code from the manufacturer code and the product code. In one exemplary embodiment of the invention, conversion program function 900 can insert the manufacturer code and the product code into the decoded bar code. In another exemplary embodiment of the invention, conversion program function 900 can compress the manufacturer code and the product code into a compressed code and can insert the compressed code into the decoded bar code. Te manufacturer code can be a UPC-A manufacturer code, the product code can be a UPC-A product code, and the compressed code can be a UPC-E compressed code. Conversion program function 900 can compress the manufacturer code and the product code into a compressed code using a known UPC-A to UPC-E conversion algorithm.

At block 2208, conversion program function 900 can transmit the decoded bar code a computer. In one exemplary embodiment of the invention, at block 2210, conversion program function 900 can transmit the decoded bar code to the computer via radio transceiver 1604. In another exemplary embodiment of the invention, the computer can be electronic cash register 2100.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. An apparatus comprising:
    an image sensor that captures one or more frames of image data within an area in front of the terminal;
    a radio frequency identification ("RFID") reader that performs a plurality of reads of one or more candidate RFID tags in response to determining, from the one or more frames of image data, that an object is present in front of the terminal; and
    a processor that calculates an accumulated received signal strength indication (RSSI) for each of the one or more candidate RFID tags and determines a target RFID tag having a highest accumulated RSSI among a plurality of the one or more candidate RFID tags.

2. The apparatus of claim 1, further comprising a trigger, wherein the processor is operative to direct the image sensor to capture the one or more frames of image data in response to an actuation of the trigger.

3. The apparatus of claim 1, wherein the plurality of reads is configurable by a user.

4. The apparatus of claim 1, wherein the accumulated RSSI of one of the one or more candidate RFID tags comprises the sum of one or more RSSIs.

5. The apparatus of claim 4, wherein each of the one or more RSSIs corresponds to a different radio signal received in the plurality of reads from the one of the one or more candidate RFID tags.

6. The apparatus of claim 1, wherein the highest accumulated RSSI is the accumulated RSSI that is highest among the one or more candidate RFID tags.

7. The apparatus of claim 1, wherein an indication of a successful RFID tag read is generated for at least one of the plurality of reads.

8. The apparatus of claim 7, wherein the indication comprises an audible sound.

9. A terminal for use in converting an electronic product code (EPC) into a decoded bar code, the terminal comprising:
    at least one processor that:
        receives the EPC from an RFID reader;
        converts a manager number of the EPC into a manufacturer code;
        converts an object class of the EPC into a product code;
        constructs the decoded bar code from the manufacturer code and the product code, the decoded from a bar code comprising data being in a format in the same way as data that has been decoded from a bar code; and
        performs a query of a database using at least a portion of the decoded bar code.

10. The terminal of claim 9, further comprising a radio frequency identification ("RFID") reader that reads the EPC from an RFID tag.

11. The terminal of claim 9, wherein a hexadecimal representation of the manager number is converted into a decimal representation of one of the manufacturer code or the product code.

12. The terminal of claim 9, wherein the manufacturer code comprises one of a Universal Product Code manufacturer code or a European Article Number manufacturer code.

13. The terminal of claim 9, wherein manufacturer code comprises one of a European Article Number product code or a Universal Product Code product code.

14. The terminal of claim 9, wherein the manufacturer code and the product code are compressed into a compressed code.

15. The terminal of claim 14, wherein the compressed code is inserted into the decoded bar code.

16. The terminal of claim 9, wherein the decoded bar code is transmitted to a computer.

17. The terminal of claim 16, wherein the terminal further comprises a radio transceiver, and wherein the radio transceiver is utilized to transmit the decoded bar code to the computer.

18. A non-transitory computer readable storage medium having computer readable program code embodied therein, the computer program code configured to perform a method when executed by a computer, the method comprising:
    capturing one or more frames of image data within an area proximate to a terminal;
    performing, by a radio frequency identification ("RFID") reader, that performs a plurality of reads of one or more candidate RFID tags in response to determining, from the one or more frames of image data, that an object is present in the proximate area of the terminal; and
    calculating an accumulated received signal strength indication (RSSI) for each of the one or more candidate RFID tags and determining a target RFID tag having a highest accumulated RSSI among a plurality of the one or more candidate RFID tags.

19. The computer readable storage medium of claim 18, wherein the method further comprises initiating the capturing in response to an actuation of a trigger of the terminal.

20. The computer readable storage medium of claim 18, wherein the method further comprises generating an indication of a successful RFID tag read.

* * * * *